US009867058B2

(12) United States Patent
Tudose et al.

(10) Patent No.: US 9,867,058 B2
(45) Date of Patent: Jan. 9, 2018

(54) SHARED USE OF LICENSED FREQUENCY SPECTRUM IN A MOBILE COMMUNICATIONS NETWORK

(71) Applicant: NOKIA SOLUTIONS AND NETWORKS OY, Espoo (FI)

(72) Inventors: Lucia Elena Tudose, Espoo (FI); Janne Juhani Parantainen, Helsinki (FI); Vesa Tapio Hartikainen, Lepsämä (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/894,849

(22) PCT Filed: May 27, 2014

(86) PCT No.: PCT/EP2014/060879
§ 371 (c)(1),
(2) Date: Nov. 30, 2015

(87) PCT Pub. No.: WO2014/191375
PCT Pub. Date: Dec. 4, 2014

(65) Prior Publication Data
US 2016/0119793 A1  Apr. 28, 2016

(30) Foreign Application Priority Data

May 31, 2013 (FI) ...................................... 20135606

(51) Int. Cl.
*H04W 16/14* (2009.01)
*H04W 16/24* (2009.01)
*H04W 64/00* (2009.01)

(52) U.S. Cl.
CPC .......... *H04W 16/14* (2013.01); *H04W 16/24* (2013.01); *H04W 64/003* (2013.01)

(58) Field of Classification Search
CPC ... H04W 16/14; H04W 64/003; H04W 16/24; H04W 64/00; H04W 72/00;
(Continued)

(56) References Cited

U.S. PATENT DOCUMENTS 6,487,414 B1 * 11/2002 Tanay .................. H04W 16/18
455/450
2005/0136931 A1   6/2005 Bigler et al.
(Continued)

FOREIGN PATENT DOCUMENTS

JP    2007318235 A    12/2007
KR   20100014708 A    2/2010
(Continued)

OTHER PUBLICATIONS

Korean Search Report/Office Action application No. 10-2015-7037199 dated Nov. 16, 2016.
(Continued)

*Primary Examiner* — Meless Zewdu
(74) *Attorney, Agent, or Firm* — Squire Patton Boggs (US) LLP

(57) ABSTRACT

There is provided shared use of licensed frequency spectrum in a mobile communications network, while maintaining confidentiality between the license holder and the licensee. Geographical information on availability of licensed frequency spectrum for shared use is obtained. A site map of a mobile communications network is obtained. The site map includes locations of sites, where wireless access to the mobile communications network is provided. A configuration of frequencies for the sites on the basis of the available licensed frequencies for shared use at each location of the sites is determined.

19 Claims, 8 Drawing Sheets

(58) Field of Classification Search
CPC .......... H04W 72/044; H04W 72/0486; H04W 72/10; H04W 16/18; H04W 16/22; H04W 16/16; H04W 16/00; H04W 16/02; H04W 16/06; H04W 72/04; H04W 16/30; H04W 28/16; H04W 4/02; H04W 88/00; H04W 88/02; H04W 88/12; H04W 88/18; H04W 48/00; H04W 48/02; H04W 48/08; H04W 4/001; H04W 4/021; H04W 4/025
See application file for complete search history.

(56) References Cited

U.S. PATENT DOCUMENTS

| | | | |
|---|---|---|---|
| 2007/0263566 A1* | 11/2007 | McHenry | H04W 16/14 370/329 |
| 2010/0137014 A1 | 6/2010 | Rao et al. | |
| 2010/0145862 A1 | 6/2010 | Chang | |
| 2011/0026506 A1* | 2/2011 | Macnaughtan | G01S 5/0236 370/338 |
| 2012/0071188 A1* | 3/2012 | Wang | H04W 16/14 455/509 |
| 2012/0120887 A1 | 5/2012 | Deaton et al. | |
| 2012/0185429 A1* | 7/2012 | Shu | H04W 24/08 707/609 |
| 2012/0208558 A1* | 8/2012 | Bajko | H04W 72/0453 455/456.1 |
| 2012/0282942 A1 | 11/2012 | Rosa et al. | |
| 2013/0023216 A1* | 1/2013 | Moscibroda | H04W 16/14 455/63.1 |
| 2013/0035108 A1 | 2/2013 | Joslyn et al. | |
| 2013/0035124 A1 | 2/2013 | Schmidt et al. | |
| 2013/0070626 A1 | 3/2013 | Gaal et al. | |
| 2013/0083783 A1 | 4/2013 | Gupta et al. | |
| 2013/0242872 A1* | 9/2013 | Koide | H04W 24/04 370/328 |
| 2014/0051467 A1* | 2/2014 | Tan | H04W 16/14 455/501 |
| 2014/0221000 A1* | 8/2014 | Roberts | H04W 64/00 455/454 |
| 2015/0148054 A1* | 5/2015 | Futaki | H04W 16/14 455/454 |

FOREIGN PATENT DOCUMENTS

| | | |
|---|---|---|
| WO | WO 2005/067324 A1 | 7/2005 |
| WO | WO 2008/109641 A2 | 9/2008 |
| WO | WO 2012/158548 A1 | 11/2012 |

OTHER PUBLICATIONS

International Search Report & Written Opinion dated Dec. 1, 2014 corresponding to International Patent Application No. PCT/EP2014/060879.
Pier Luigi Parcu et al., "Authorised Shared Access (ASA), an Innovative Model of Pro-competitive Spectrum Management," Studio Economico, Parcu & Associati, 2011, 42 pages.

* cited by examiner

Shaded area represents areas with usage restriction

SHARED USE OF LICENSED FREQUENCY SPECTRUM IN A MOBILE COMMUNICATIONS NETWORK

BACKGROUND

Traditionally, frequency spectrum access has been granted by regulatory authorities for exclusive use on permanent basis. This means that licensee has right for permanent reservation defined by regulatory authorities. Recently a new method known as Authorized Shared Access (ASA) or Licensed Shared Access (LSA) has been defined to complement existing spectrum licensing mechanisms.

Fast increase of smart phones penetration and subsequent growth of mobile broadband traffic means that there is huge need for finding new spectrum bands to serve the traffic. However, it is difficult to find new bands where there is wide enough bandwidth available and where the band has otherwise appealing characteristics. At the same time there are certain frequency bands that are reserved for e.g. military, costal guard or wireless camera type use but where the actual usage is typically limited to specific geographic location or times of the day or combinations of the two. In wide geographic areas and/or large parts of time the spectrum can be practically clean from signals. Hence it would be logical to create a formal reallocation framework which allows taking the low use spectrum into commercial use while maintaining incumbents' rights and ability to use the band when/where needed. ASA introduces this framework. However, the ASA framework is still under development and there are many open issues related to how the high level concept will be merged with technologies and solutions that are used in wireless broadband networks.

"Authorised Shared Access (ASA). An Innovative Model of Pro-competitive Spectrum Management," by Nokia Corporation and Qualcomm Corporation is a white paper that is hereby incorporated herein by reference in its entirety. This white paper proposes dynamic sharing of spectrum resources. In other words, it proposes sharing, where allocations/assignments of available spectrum resources are static based on strict agreements and a dynamic component of sharing is provided when and where the shared spectrum is released by incumbent.

FIG. 1 illustrates an ASA spectrum sharing architecture according to a contemporary approach. As shown in FIG. 1, the architecture may include an ASA Repository 110, which is a database. This database contains the relevant information on spectrum use by the incumbent 120 in the spatial, frequency and time domains. For the purpose of ASA, an "incumbent" is defined as a current holder of spectrum rights of use. It is possible that the incumbent has been granted the spectrum rights through an award procedure (e.g. first-come, first-served, beauty contest, and auction). On the other hand, however, the incumbent 120 may be viewed as the original or default owner of the spectrum. For example, the incumbent 120 may be a government agency, such as the Department of Defense, the Department of Homeland Security, the Federal Aviation Administration or other spectrum users such as Satellite Services or Broadcasters. The database may add safety margins and deliberate distortions to the actual use data in order to mask the true activity of the incumbent 120. The incumbent 120 may not be willing to give precise information about its spectrum use to ASA licensees, for reasons primarily connected to the nature of its service, which may be defense operations, interference management, network security, emergency services or privacy. Due to the sensitive nature of the incumbent's information, in some cases the ASA repository 110 could be country-specific and under the purview of the National Regulatory Authority (NRA), such as the Federal Communications Commission or the National Telecommunications and Information Administration (NTIA). There could be one or more repositories per country, depending on the ASA band and the incumbent's nature: public or commercial. The ASA repository 110 may be directly managed by the administration or the NRA (illustrated in combination as the administrator/regulator 130) or by the incumbent 120, or be delegated to a trusted third party.

As shown in FIG. 1, the architecture may also include ASA controller 140. The ASA controller 140 computes ASA spectrum availability based on rules built upon ASA rights of use and information on the incumbent's use provided by the ASA repository 110. It connects to the ASA repository 110 through a secure and reliable interface. There could be one or multiple ASA controllers per country. The ASA controller 140 can interface with one or multiple ASA repositories as well as with one or multiple ASA networks. The ASA controller 140 may be managed by the administrator/regulator 130, the ASA licensee(s) 150 or a trusted third party.

ASA network operations, administration and maintenance (OAM) corresponds to the OAM of mobile broadband networks. The OAM in the ASA licensee network takes care of the actual management of the ASA licensed spectrum. In practical terms, the OAM translates into radio resource management (RRM) commands the information on spectrum availability obtained from the ASA controller 140. These commands are then transmitted to base stations 160, 165 in the ASA licensee's network, as contrasted to incumbent base station(s) 125. Based on this information, the base stations 160, 165 enable user devices 170 to access the ASA spectrum or order them to hand off seamlessly to other frequency bands as appropriate subject to, for example, ASA spectrum availability, quality of service (QoS) requirements, data rates or data plans. Information coming from the OAM also allows the base stations 160, 165 to tune to different channels or to power down.

One concern regarding the implementation of the ASA spectrum sharing architecture is how the ASA incumbents can give their licensed frequency spectrum to be used by ASA licensees without compromising the confidentiality of network configurations are conventionally classified information that are highly relevant to the business of the mobile network operators, i.e. the ASA licensee and the ASA incumbent.

Furthermore, the number of base stations that use the frequency spectrum, may have different characteristics, e.g. in terms of transmission power, directional patterns of antennas, antenna tilting angles and antenna gains to name a few. The differences may result e.g. from the sites using equipment from different manufacturers. Therefore, a frequency spectrum licensed to different ASA licensees using different equipment for transmissions may cause different results in terms of interference on the licensed frequency band.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

Various embodiments comprise methods, apparatuses and a computer program product as defined in the independent claims. Further embodiments are disclosed in the dependent claims.

According to an aspect of the invention there is provided a method by a system capable of communicating with a geo-location database maintaining geographical information on availability of licensed frequency spectrum for shared use, and a database storing a site map of a mobile communications network, said map including locations of sites, where wireless access to the mobile communications network is provided, the method comprising obtaining geographical information on availability of licensed frequency spectrum for shared use, obtaining a site map of a mobile communications network, said map including locations of sites, where wireless access to the mobile communications network is provided, determining a configuration of frequencies for the sites on the basis of the available licensed frequencies for shared use at each locations of the sites.

According to an aspect of the invention there is provided a method by a geo-location database connected to a node managing a frequency configuration of a mobile communications network, the method comprising maintaining information on shared use and licensor use of licensed frequencies, determine, on the basis of the maintained information, availability of the licensed frequencies for the shared use, and communicating the availability of the licensed frequencies for the shared use to the node managing a frequency configuration of a mobile communications network, when the availability of the licensed frequencies changes or a request is obtained from the node for the availability of the licensed frequencies for the shared use.

According to an aspect there is provided an apparatus according to an aspect, said apparatus including means to perform a method according to an aspect.

According to another aspect there is provided an apparatus comprising at least one processor, and at least one memory including computer program code, the at least one memory and the computer program code configured to, with the at least one processor, cause the apparatus at least to perform a method according to an aspect.

According to another aspect there is provided a computer program product comprising executable code that when executed, cause execution of functions of a method according to an aspect.

Although the various aspects, embodiments and features of the invention are recited independently, it should be appreciated that all combinations of the various aspects, embodiments and features of the invention are possible and within the scope of the present invention as claimed.

Some aspects facilitate the shared use of licensed radio frequencies without compromising the confidentiality of the license holder's sensitive spectrum utilization information and/or the confidentiality of the network configuration, where the shared licensed frequencies are utilized, when they are available as underutilized by the license holder.

BRIEF DESCRIPTION OF THE DRAWINGS

In the following various embodiments will be explained with reference to the accompanying drawings in which.

DETAILED DESCRIPTION

In the following various embodiments are provided, where shared use of licensed frequencies is facilitated, when the licensed frequencies are underutilized by the owner of the license. The sharing of the licensed frequencies may follow the ASA concept explained with FIG. 1 and below with FIGS. 10a and 10b. The licensed frequencies are used to provide radio access and connections to radio terminals, for example in a mobile communications network. Typically the radio communications is provided by radio transmitters, e.g. Base Transceiver Stations, located at defined geographical locations, e.g. sites. These locations may be defined in coordinates, e.g. in the coordinates of the Global Positioning System. The shared use of radio frequencies introduces the possibility of interference caused by the transmissions on the shared radio frequency. It should be appreciated that the radio transmissions are typically arranged by having one or more cells at each BTS, whereby the transmissions from the cells may be a source of interference, for example when regulations regarding the use of the radio spectrum are not followed and/or network planning is incomplete. Therefore, in the following description, it is referred to BTSs and particularly to cells of the BTSs, when the radio interference aspects are considered and to the sites, when the location of the radio transmission equipment is considered. However, since the sites include one or more radio transmitters, the interference aspects are present also when the sites are discussed.

Figure 2:
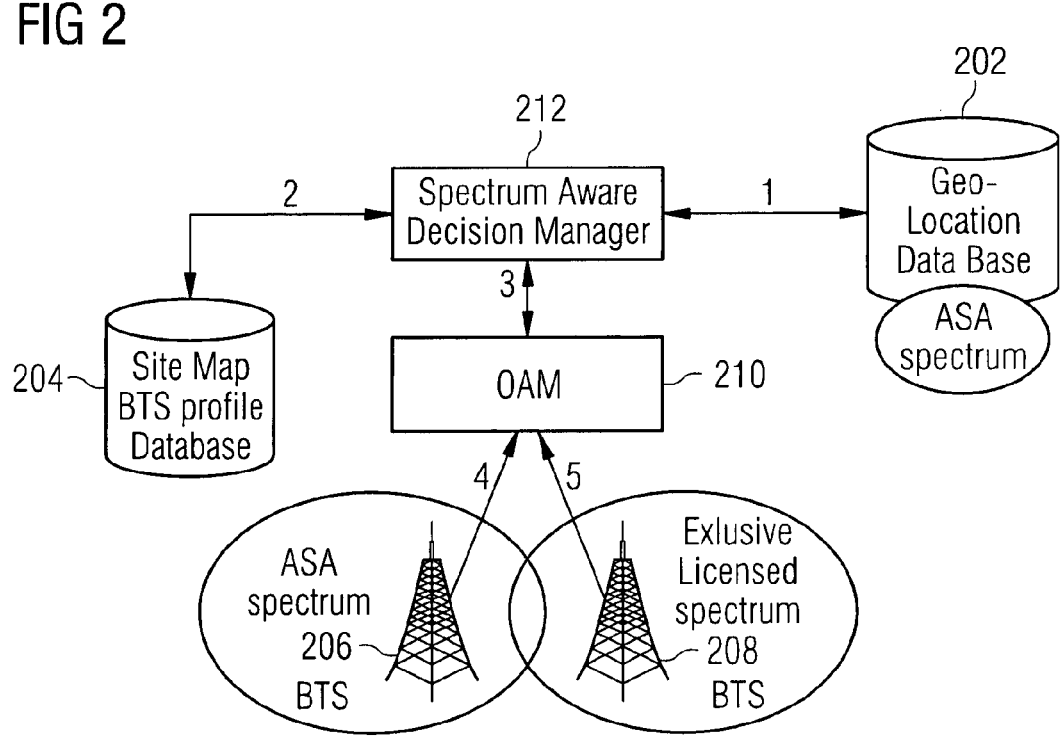
FIG. 2 illustrates architecture for managing shared use of licensed spectrum in a mobile communications network.

FIG. 2 illustrates architecture for managing shared use of licensed spectrum in a mobile communications network. The system comprises a geo-location database 202 that includes information of licensed frequency spectrum and information of geographical location associated with the licensed frequency spectrum. The licensed frequency spectrum preferably includes frequency spectrum that is available for shared use, when the frequency spectrum is underutilized by the holder of the license.

A site map and Base Transceiver Station (BTS) profile database includes location information of BTSs 206, 208 of a mobile communications network and BTS profiles defining characteristics of the BTSs. Examples of the mobile communications network include networks according to the specifications defined by the 3GPP such as Global System for Mobile communications (GSM), Universal Mobile Telecommunications System (UMTS) or Long Term Evolution networks.

An Operations, Administration and Management (OAM) system 210 is connected to the BTSs. The OAM provides the processes, activities, tools, standards etc. involved with operating, administering, managing and maintaining the BTSs. An example of an OAM system is NetAct that is a product of the Nokia Siemens Networks.

A decision mechanism 212, hereafter referred to as a Decision Manager (DM), is connected to communicate with the geo-location database 202, the site map and BTS profile database 204 and the OAM. The DM, may include network planning and controller functionality to enable management of generating a spectrum deployment plane for the BTSs based on the information received form the databases. The DM may be implemented as an enhancement an existing OAM such as the OAM.

Figure 1:
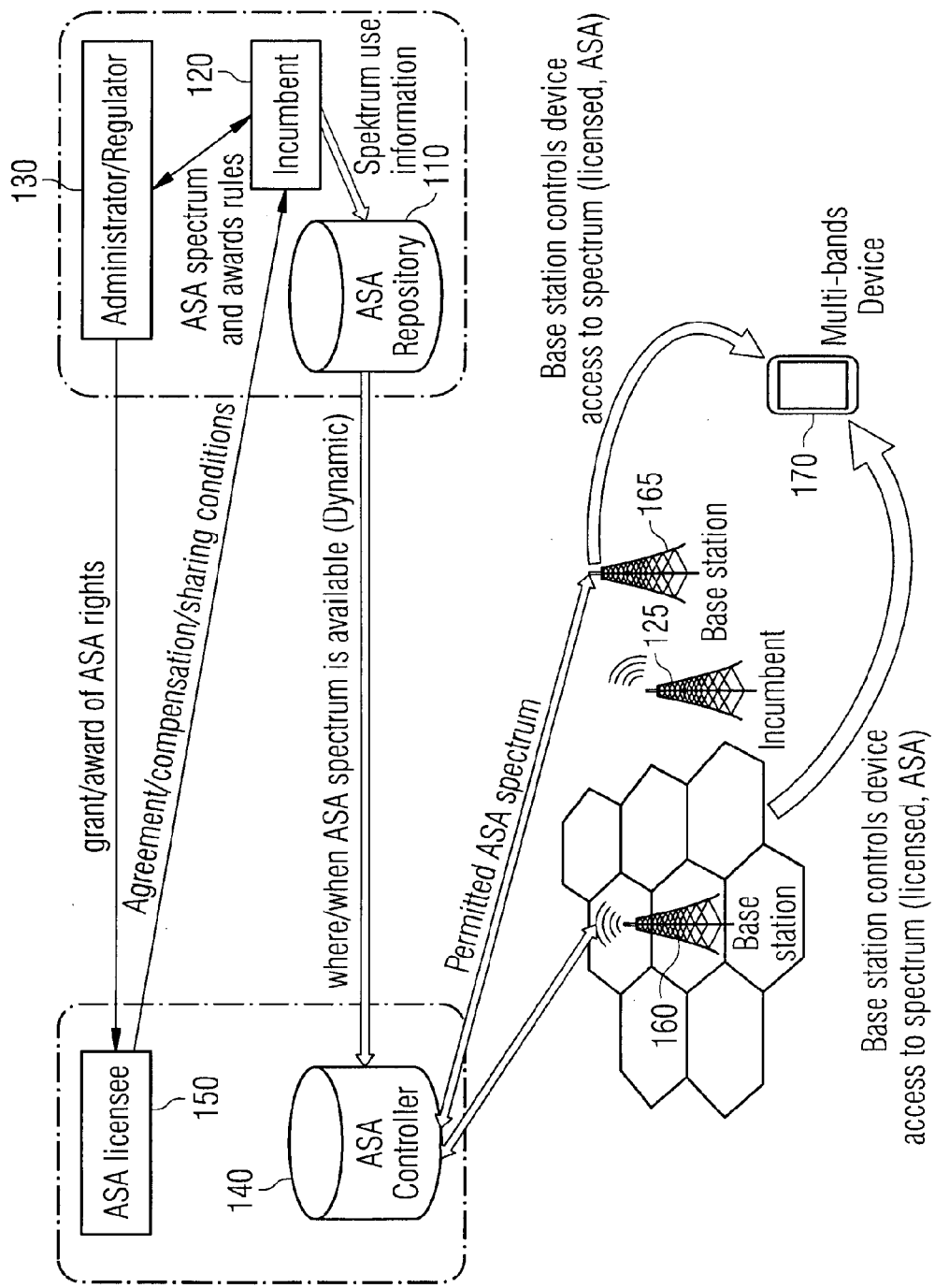
FIG. 1 illustrates the ASA spectrum sharing architecture according to a contemporary approach.

The ASA spectrum sharing architecture of FIG. 1 may be provided by the geo-location database operating as ASA repository, and the DM may operate as the ASA controller and the ASA licensee of the ASA architecture illustrated in FIG. 1. Then, referring to FIG. 2, the DM communicates the permitted ASA spectrum defining the frequency configuration of the BTSs to the OAM to be commissioned to the BTSs.

Figure 3:
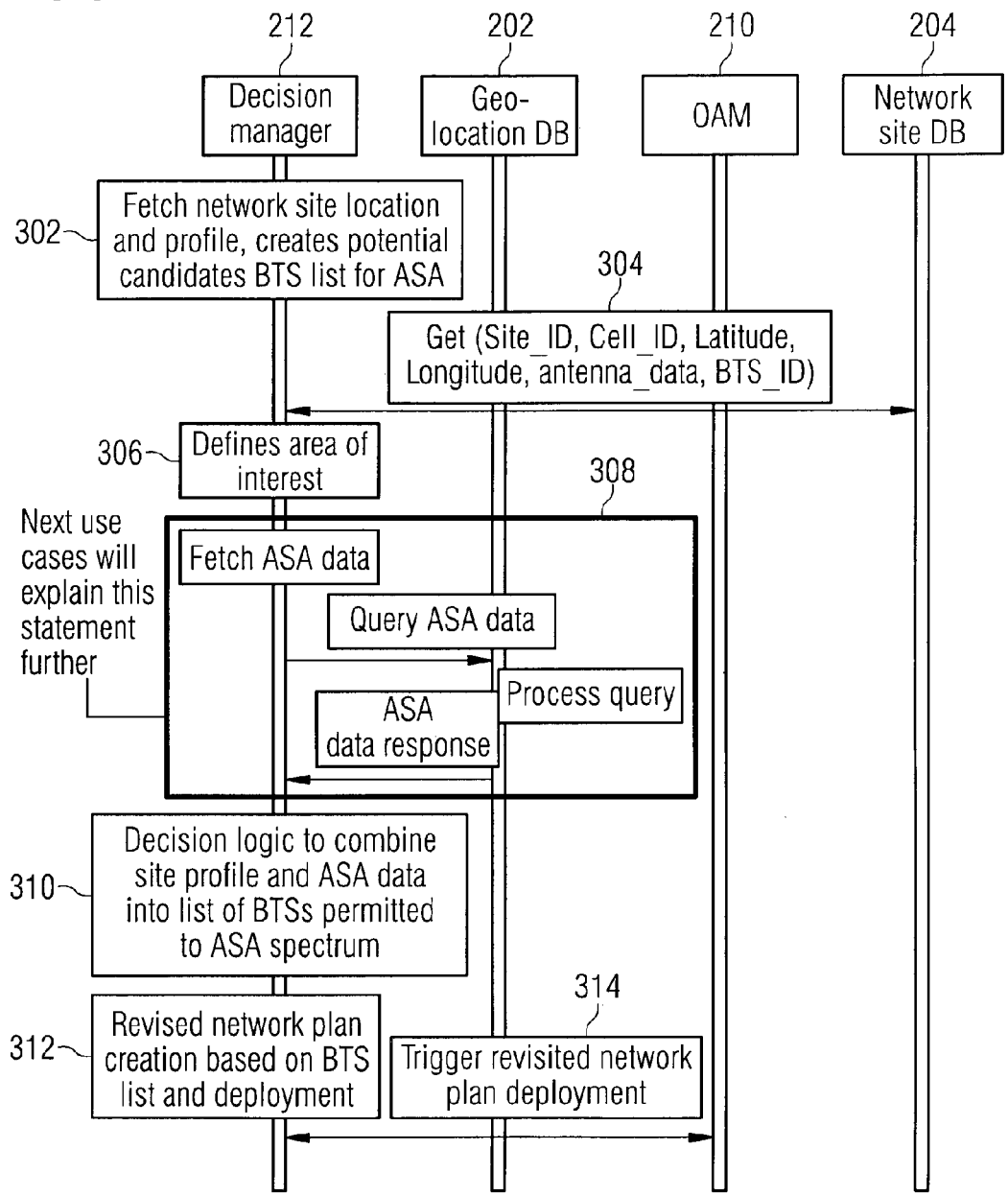
FIG. 3 illustrates a general workflow of between entities executing methods according to embodiments.

FIG. 3 illustrates a general workflow of between entities executing methods according to embodiments. The workflow will be now explained by referring to the architecture in FIG. 2. The DM 212 is positioned between the geo-location database 202 and a mobile communications network 206, 208, and the DM is connected to the geo-location database on interface #1, to the site map and BTS profile database on interface #2, and to the OAM on interface #3. The interfaces are only a logical representation and the actual implementation of the interfaces may vary.

The DM starts operation by calculating 306 coverage areas of the BTSs. To facilitate the calculations, the DM obtains a site map of the mobile communications network. The sites provide wireless access to the mobile communications network. A site may be understood to refer to a location where network elements or other telecommunication equipment have been installed. A site can contain, for example, a BTS, with an equipment shelter and antenna tower. Several network elements can be located at a site. A BTS may be understood to refer to a network element in a mobile network responsible for radio transmission and reception to or from the user equipment, e.g. a mobile station. Each site comprises at least one BTS that is deployed for wireless communications with user equipment. Each BTS may include one or more cells that each may offer a wireless access service to user equipment.

The site map includes BTS geo-coordinates and other related information and is typically stored in a site database as illustrated in FIG. 2. The site map may be obtained by a query 304, e.g. a "get" command, according to the structure and language of the database, as is well-known to the skilled person. Then, in response to the query, a response 304 from the database may include the site map. The site map includes geographical locations of the BTSs and information identifying the operational parameters of the BTSs. The operational parameters are typically referred to as profiles and they may include BTS and/or cell level information including an operational frequency, identification, transmission power and antenna orientation, for example. The geographical location may be identified using a selected coordinate system, for example the Global Positioning System (GPS) coordinates. An example of site map including profile information is illustrated in item 802 in FIG. 8.

Referring now back to FIG. 3, the information received in the response 304 to the query may be processed 306 to obtain parameters, e.g. coverage areas to query the geo-location database.

The calculation of coverage areas may comprise calculating a target coverage area or a current coverage area. A target coverage area may be an area of interest, where an operator of the mobile communications network wants to provide network coverage, improve an existing network coverage already provided by the BTSs in the site map and/or increase data transfer capacity. The target coverage area may define the area of interest roughly, thereby not necessarily defining the target coverage area at BTS level but at the level of geographical areas defining current or planned service areas of the BTSs by names of municipalities or suburbs or parts of municipalities or suburbs. For example, a part of the municipality of Helsinki may be defined as the area of Eastern Helsinki. In another example a postal code may be used to define the target coverage area. Thereby, the rough definition of the target coverage area provides a broad definition of the area of interest to the operator. A current coverage area may be the geographical area currently covered by the BTSs. The coverage areas may be calculated for each BTS and for each cell of the BTSs. The target coverage area/"area of interest" and the current coverage are may be defined by a coordinate system, for example by coordinates of the Global Positioning System (GPS). For example, the area of Eastern Helsinki may be defined by a polygon having corner points defined by the GPS coordinates. The size of the polygon may be defined such that the area of Eastern Helsinki fits within the polygon, whereby the borders of the Eastern Helsinki area are within the polygon or at most overlapping the borders of the polygon.

It should be appreciated that the area of interest may not have a direct binding with coverage areas of BTSs. Accordingly, the area of interest may merely reflect a geographical area defining an area of a municipality or a suburb, for example. Accordingly, in various embodiments the area of interest may be defined to serve the purpose of communicating with the geo-location database to obtain information on availability of licensed frequency spectrum for shared concerning the area of interest. The obtained information may include restrictions and/or permissions regarding the use of the licensed frequency spectrum for shared use.

In 308, geographical information on availability of licensed frequency spectrum for shared use is received by a query to the geo-location database 202. The query may include an area of interest determined in 306. After receiving a response from the geo-location database regarding the area of interest, the DM determines 310 which BTSs are really affected and how the BTSs are affected. Thereafter, the DM determines 312 the BTS configuration in such way that the resulting BTS coverage areas do not infringe spectrum DB restrictions.

The geo-location database maintains information on shared use and licensor use of licensed frequencies. The maintained information determines availability of the licensed frequencies for the shared use. In response to queries to the geo-location database, the database provides information of the availability of the licensed frequencies for the shared use. The geo-location database may operate as ASA repository, when licensed frequencies are shared under the ASA concept.

The geographical information received from the geo-location database may comprise information of one or more geographical areas associated with a limit for received power, a permitted licensed frequency for shared use, a validity period of the information or their combination. The limit of received power may define a maximum received power received in the associated geographical area. The validity period may comprise an indication of a time including a time of day and a date or a time until the received information is valid. The validity period may also be defined as a time period of validity, defined .g. in hours or days.

In 310 the DM has obtained 308 geographical information on the availability of licensed frequency spectrum for shared use and determined 306 coverage areas of the BTSs and the obtained information and coverage areas are processed to decide on the shared use of licensed frequencies as operational frequencies of the BTSs. These frequencies may comprise ASA frequencies, for example. The processing 310 may comprise combining the geographical information and information on coverage areas to form a decision on the use of the ASA frequencies. In the combining, the geographical information may be matched with information of coverage areas of BTSs or cells to determine, whether the BTS or the cell is allowed or restricted the use of ASA frequencies. Typically, non-ASA frequencies would provide an ASA licensee continuous coverage on licensed frequencies, e.g. 900 MHz, and additional capacity that may or may not be continuous provisioned dynamically on the ASA bands.

Figure 8:
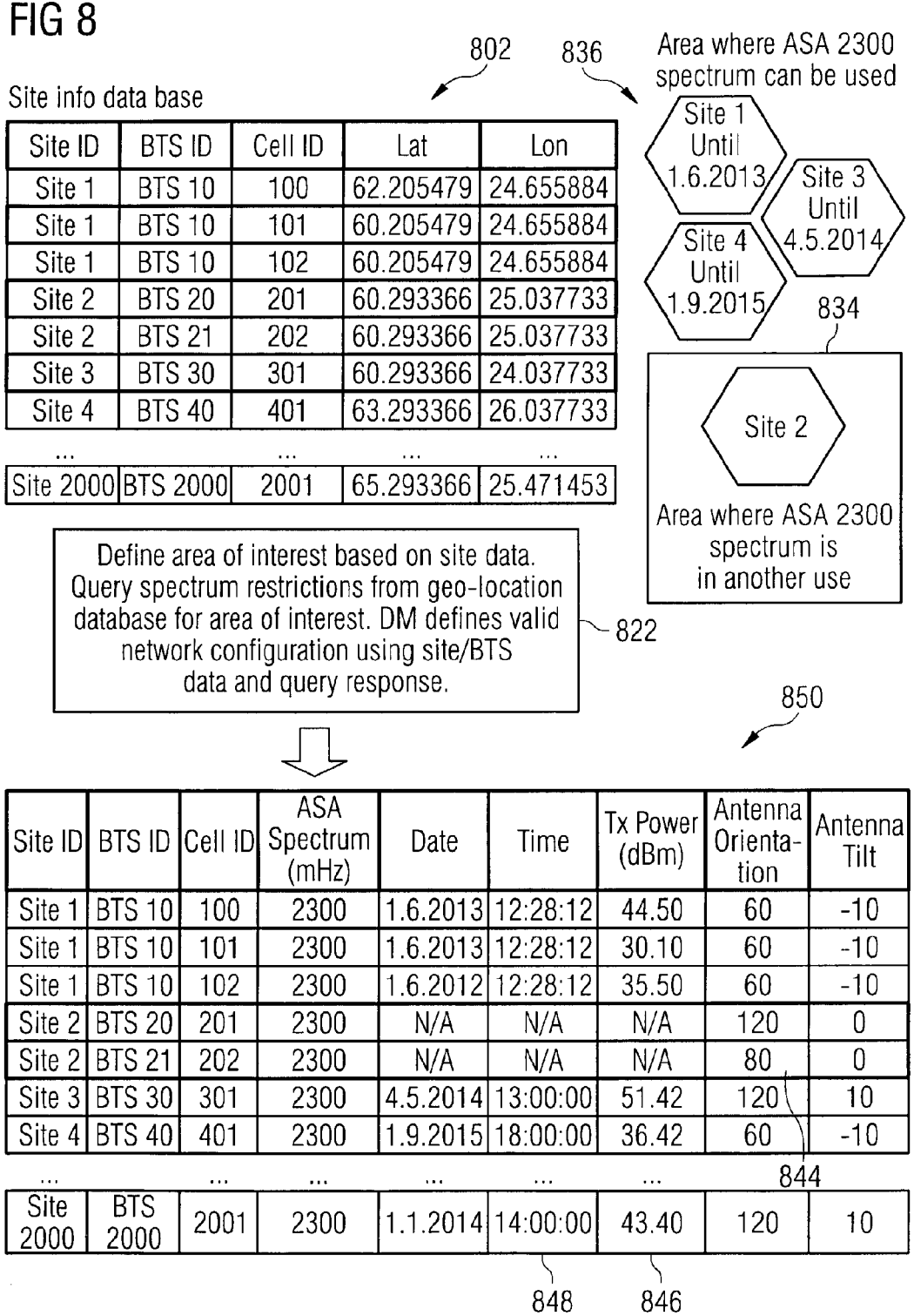
FIG. 8 illustrates dynamic site view creation.

In 312 a new network plan may be generated on the basis of the decision to allow and/or reject use of ASA frequencies to the sites. The network plan defines a configuration of the sites. The configuration may define a configuration of frequencies for the BTSs on the basis of the available licensed frequencies for shared use at each location of the sites. Cells or BTSs that were determined 310 not be allowed to use ASA frequencies, may be switched off, or they may be configured with other operational frequencies. It should be appreciated that the geographical information received in 308 may further be used to adjust profiles of the sites to allow the BTSs and cells to use ASA frequencies under the restrictions received from the geo-location database. Accordingly, new profiles may be defined for the BTSs and cells that have been rejected the use of ASA frequencies. The new profiles may define other operational frequencies than ASA frequency, a new antenna orientation, e.g. tilting angle of the antenna for example. The other operational frequencies may comprise frequencies that are owned, e.g. licensed, by the operator. The resulting network plan includes profiles of the sites adjusted on the basis of the restrictions received from the geo-location database. Item 850 in FIG. 8, is a site view that illustrates an example of a network plan.

In 314 the network plan is deployed to the mobile communications network by communicating the network plan to the OAM that manages the network and the BTSs. The network plan may be updated dynamically by queries 308 for permission information or restriction information on the availability of ASA frequencies for shared use, whereby the updating follows the steps of 310 through 314 to deploy any changes to the network plan to the network.

It should be appreciated that also changes in the deployed BTSs of the mobile communications network are possible. Upon such changes, the shared use of ASA frequencies may be effected to the mobile communications network by executing the process steps 302 to 314. In this way a network plan may be determined for the mobile communications network such that the changes in the deployed BTSs may be considered in the configuration of the operational frequencies including the ASA frequencies.

Figure 4:
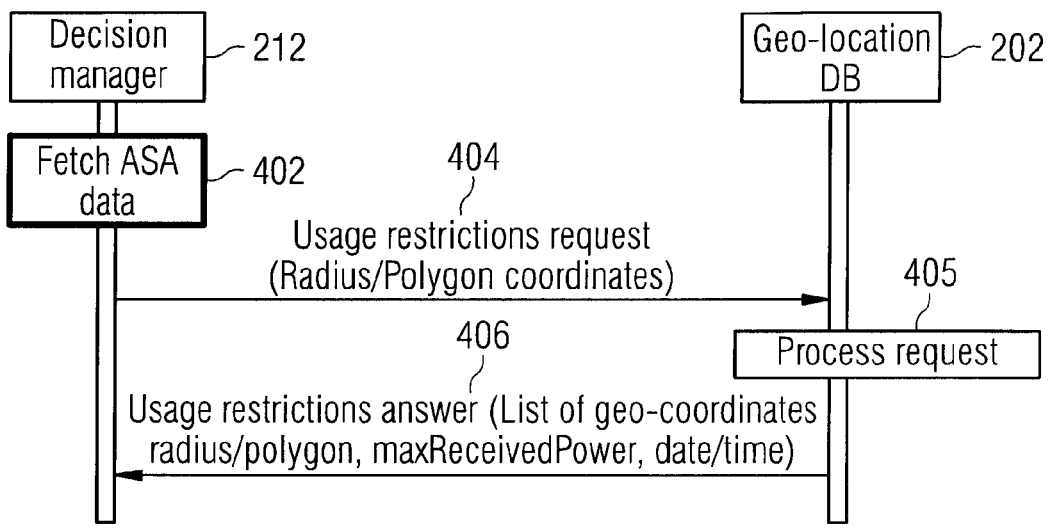
FIG. 4 illustrates an operation of providing usage restrictions for the licensed frequency spectrum, according to an embodiment.
Figure 6:
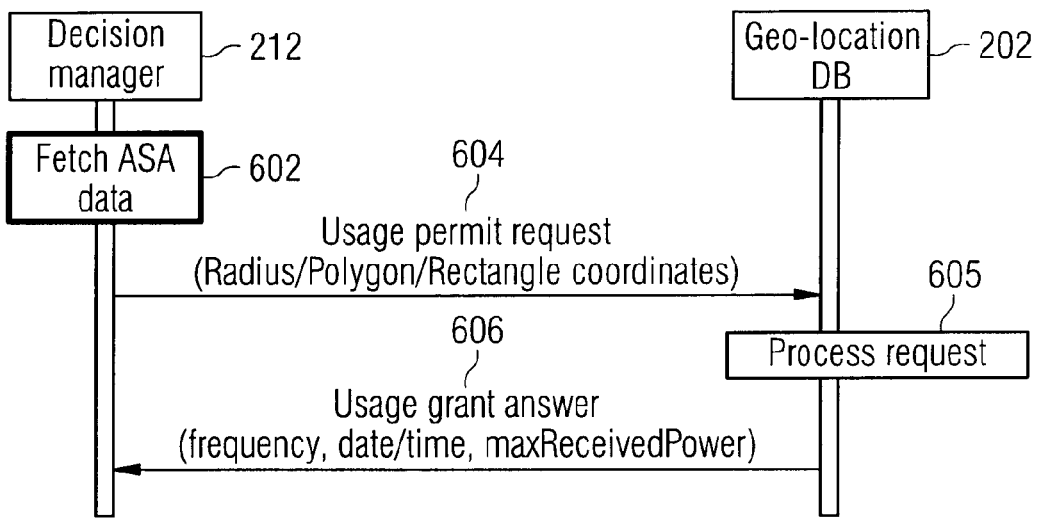
FIG. 6 illustrates an operation providing usage permissions for the licensed frequency spectrum, according to an embodiment.

FIGS. 4 and 6 illustrate providing geographical information on availability of licensed frequency spectrum for shared use. The geographical information may be provided by a geo-location database 202 in FIG. 2, for example. The geographical information may define usage restrictions or permissions and associated with the geographical areas.

FIG. 4 illustrates an operation of providing usage restrictions for the licensed frequency spectrum, according to an embodiment. The embodiment is now explained with reference to the architecture of FIG. 2. The embodiment may be executed in step 308 of FIG. 3. The process may start 402, when information on availability of licensed frequencies, e.g. ASA frequencies, for shared use is needed. This may be in response to determining a change in coverage areas calculated for the present network configuration and new coverage areas calculated for the network. The calculation of the coverage areas may be performed as explained in steps 302 through 306. In one example, one or more new BTSs may be deployed to the mobile communications network and the geo-location database is queried for usage restrictions to their target coverage areas.

Accordingly, usage restrictions may be received in response 406 to a request 404 including information identifying one or more geographical areas of interest. The geo-location database processes 405 the received information on the geographical areas to determine, whether the received areas overlap with the utilization areas of the licensed frequencies by the license holders. When an overlap is determined, usage restrictions for the overlapping area may be sent to the DM.

The geographical areas of interest may correspond with the determined coverage areas of the BTSs or targeted coverage areas of BTSs. Since the coverage areas are calculated by the DM, configuration of the BTSs, for example information on transmission powers, antenna orientation, is not necessary to send to the geo-location database, whereby the configuration of the network remains hidden from the geo-location database.

It is possible to add distortion to the geographical information corresponding to an area of interest, e.g. a planned coverage area sent to the geo-location database in order to avoid sending specific information to the geo-location database that might reveal the network configuration. The distortion may be added by a distortion function that may add distortion uniformly to the coverage area information. The distortion function may be executed, when the need for ASA frequency information is determined 402.

It should be appreciated that the area of interest may not have a direct binding with coverage areas of BTSs, whereby it may not be necessary to use the distortion function. In one example of the distortion function, the coverage area information received as input to the distortion function may increase the coverage areas by a relative value defined in percentages of the determined coverage area and/or by an absolute value. When the absolute value is used to increase the coverage area together with the relative value, the absolute value may be added to the coverage area before or after increasing the coverage area by the relative value. When the coverage area is increased by both the relative value and the absolute value, the original coverage area cannot be derived from the distorted coverage area without information of both the relative distortion and the absolute distortion applied to the coverage area, and in which order they were applied.

In another example, the distortion function may apply a mask pattern to the geographical information corresponding to the coverage areas. The mask pattern may be a geometric form, e.g. a rectangle, a hexagon, a circle, that encompasses a coverage area. The mask pattern may be applied specific to each coverage area, so that the geo-location database may be provided each distorted coverage area of interest to obtain corresponding restrictions.

The response 406 received to the query may include geographical information associated with a limit for received interfering power in the restricted area, a permitted licensed frequency for shared use, a validity period of the information or their combination. The limit for received power may be a limit for maximum received power. The geographical information may define a plurality of geographical areas that each may have a limit for received power, a permitted licensed frequency for shared use, a validity period of the information or their combination. The defined geographical area may be a polygon or a circular area, for example.

Figure 5:
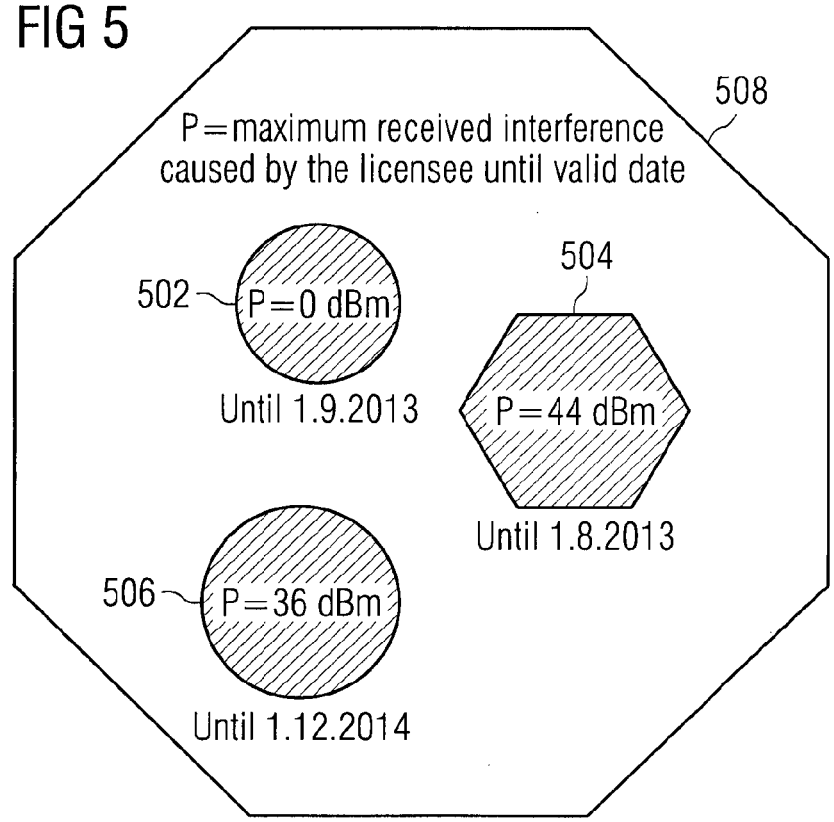
FIG. 5 shows and example of a restricted area.

FIG. 5 shows an example of an area of interest 508, including circular areas 502 and 506 and a polygon 504, each having a corresponding maximum received power level and a validity period defining validity of the restriction regarding each area. The large polygon may illustrate an area defined by the geographical location information sent to the geo-location database in 404 and the areas 502, 504 and 506 may illustrate the areas defined by geographical information received in response to the request in FIG. 4. Accordingly, it is possible that the requested geographical information overlaps or includes a plurality of geographical areas, where the use of ASA frequencies has been restricted illustrated by the circular areas 502 and 506 and the polygon 504. The geo-location database determines 405 those geographical areas stored in the geo-location database that overlap with the area defined by the information received in the response, and communicates the overlap 502, 504, 506, e.g. geographical information defining the overlapping geographical areas, to the node managing the frequency configuration of the mobile communications network.

FIG. 6 illustrates an operation providing usage permissions for the licensed frequency spectrum, according to an embodiment. The embodiment is now explained with reference to the architecture of FIG. 2. The embodiment may be executed in step 308 of FIG. 3. The process may start 602, when information on availability of licensed frequencies, e.g. ASA frequencies, for shared use is needed in a similar manner as explained with FIG. 4.

Accordingly, usage permissions may be received in response 606 to a request 604 including information identifying one or more geographical areas of interest. The geo-location database may process 605 the received information of geographical areas as described with FIG. 4 above. However, since the request is for usage permissions, the response 606 can be an indication, whether the permission was granted or not for the area indicated in the request. The indication may be implicit, e.g. by receiving a response indicating a zero maximum received power level, or explicit, where by the response may be information in a binary format, where '0' may indicate no permission to use a the frequency within the geographical area and '1' may indicate that the use of the area indicate in the request is permitted. The explicit permission may be provided in the response associated with information indicating the geographical area. The response 606 received to the query 604 may include information indicating permitted use of the geographical area indicated in the request. The permitted use information may include a maximum received power and/or a permitted ASA frequency to be used for the geographical areas identified the request. The permission of maximum received power preferably defines the permitted interfering power level. The response may define the validity of the permission information, e.g. a maximum received power level, by a date and/or time. In one example the order of geographical areas in the request 604 is used to order the information in the response, whereby the answer to permit or reject the use of ASA frequencies in a geographical area identified in the request may be determined by the order the information supplied in the response. For example, the response may include a frequency, validity time/date, and a maximum received power for each geographical area identified in the request. In this way the network configuration of the ASA licensee is not revealed to the geo-location database. Moreover, since the ASA licensee provides the geographical areas of interest in the request, the geo-location database need not to reveal usage areas of ASA frequencies to the ASA licensee, but merely provide information, whether the request of the ASA licensee is permitted or not.

Figure 7:
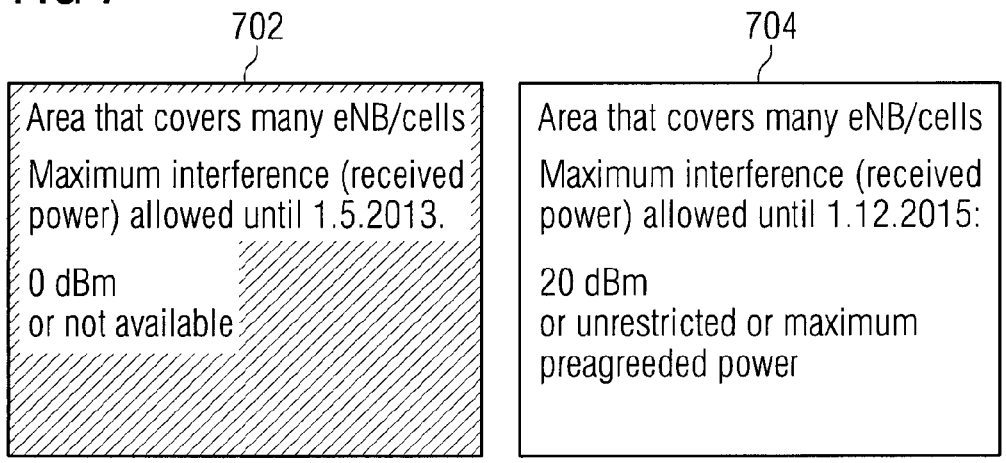
FIG. 7 illustrates an example of usage permit areas.

FIG. 7 illustrates an example of usage permit areas 702, 704. The permit areas illustrate geographical areas communicated to the geo-location database in a permission request, for example the request 604 in FIG. 6. Each of the permission areas have a validity period defined by date and/or time and a permitted received power level associated with the permit area. The validity period and the permitted power level information may have been received in the response 604 for each area defined in the request, for example. Since the received power level of the shaded area 702 is '0' dBm, use of ASA frequencies in that area is implicitly denied, whereby the use of the ASA frequencies is blocked in the area. On the other hand the request for ASA frequencies regarding the other area 704 is permitted, and the ASA frequencies may be utilized in that area. The exact operational frequency may be indicated in the response as explained above with FIG. 6.

FIG. 8 illustrates dynamic site view creation on based on information on available licensed frequencies for shared use. In the illustration, an example scenario is used, where a licensed frequency on 2.3 GHz band is shared under the ASA concept and geographical information on its availability is maintained in a geo-location database that may operate as ASA repository. The site view represents a visualization of a network plan, for example the network plan generated in step 312 of FIG. 3. Each of the sites has a BTS that may include one or more cells, whose operational frequency can be configured to a frequency on the 2.3 GHz frequency band shared under the ASA concept. The BTSs may also be able to operate on other frequency bands and frequencies than those under the ASA license, for example frequencies licensed to the operator of the mobile communications network. When ASA frequencies cannot be used, the frequencies licensed to the operator may be used as operational frequencies.

The creation of the dynamic site view may be performed by a DM that is communicating with a geo-location database and a site map and site profile database as explained various embodiments above. In the following, the steps of FIG. 3 will be referred to in the explanation of the site view generation.

The site view creation comprises obtaining 304 a site map 802 from the site map and site profile database. The site map may be obtained and used in network planning, e.g. a coverage area calculation, as explained in various embodiments above.

Information on availability of licensed frequency spectrum for shared use may be obtained 822, 308 from the geo-location database as explained in various embodiments above. The information on availability may include restriction information or permission information as explained with FIGS. 4 and 6. In the following the site view generation will be explained by referring to restriction information.

The cell coverage areas and the restriction information received from the geo-location database are processed 310, for example matched. The matching may comprise matching the coverage areas of the cells within sites with geographical information defining geographical areas and associated restrictions regarding the use of ASA frequencies. Accordingly, the matching may comprise determining whether, the restrictions defined by the restriction information apply to the BTSs/cells listed in the site map. A match between the site map and the restriction information may be determined, when the geographical coordinates received in the restriction information are within the coverage areas of the cells defined in the site map. Accordingly, the site map matches with the restriction information, when one or more coverage areas of the cells at least overlap with the restricted areas (502,504,506) received in the response message.

A result of the matching between the restriction information and the coverage areas of the cells may be used to generate 312 a site view 850 reflecting the restriction information received from the geo-location database on the use of ASA frequencies. The resulting site view is dependent on the availability of ASA frequencies to the licensee, which may change based on the use of the ASA frequencies by the licensor. Accordingly, the site view reflects the use of the ASA frequencies of the ASA incumbent and provides dynamic use of the ASA frequencies.

Following the illustration in FIG. 8, based on the restriction information received from the geo-location database, one area 834 of the network is determined 312 where it is prohibited to use the ASA frequency of 2.3 GHz. The prohibition may be for example due to the frequency being used by the incumbent. This determined area is thus a service area of the site 2 of the mobile communications network. Elsewhere 836 in the mobile communications network, the ASA frequency 2.3 GHz can be used. Depending on implementation, the exact algorithm used to determine which site or sites of the network matches with the restriction information received from the geo-location database, may vary depending on implementation.

Accordingly, in the illustration the ASA frequency of 2.3 GHz is prohibited for site 2 of the mobile communications network, since the cells in site 2 match with the restriction information from the geo-location database, e.g. by having a coverage area overlapping with the coverage area, where the ASA incumbent operates on the 2.3 GHz frequency. Thereby, the use of the ASA frequency 2.3 GHz by that site is restricted. In this case the restriction is determined as to block 844 the use of the 2.3 GHz frequency for all the cells in site 2, as is shown in the resulting dynamic site view 850.

It should be appreciated that blocking of ASA frequency as is illustrated in the resulting site view is only one possibility to meet the requirements posed by restriction information received from the geo-location database.

The site view 850 illustrates further possibilities, in addition to blocking the use of ASA frequency, including but not limited to a time, a date, antenna orientation, antenna tilt and/or a transmission power to be used for a cell, to meet the requirements posed by the restriction information. For example, when the restriction information defines a date or time until a specific restriction such as a received power level is valid, this date may be included to the dynamic site view as is illustrated by columns 846, 848. On the other hand, when the restriction information includes a restriction on the received power level, this power level 846 may be included in the dynamic site view directly or the restriction on the received power level may be used to determine a maximum transmission power level for a concerning the cells affected by the restriction. The maximum transmission power level may be determined utilizing a network planning functionality of the DM, e.g. by estimated propagation loss of radio signal.

Accordingly, in the site view 850 generated to meet the requirements posed by the restriction information, for cells in site 2 834 the use of the ASA frequency of 2.3 GHz is blocked and for the sites 1, 3 and 4 836 the use of the ASA frequency 2.3 GHz is allowed until a time and date specified in the site view.

Various embodiments provide a geo-location database that facilitates notifying mobile communications networks of changes in availability of shared licensed spectrum, e.g. ASA frequencies. In the event a geo-location database determines that a license holder, e.g. ASA incumbent, increases his utilization of the ASA frequencies, the geo-location database generates a warning message that is sent to the mobile communications network that utilizes ASA frequencies. The warning message may include for example usage restrictions as described above. In this way, the site map and e.g. frequency configuration of the sites can be updated based on the new information on the availability of the ASA frequencies. The warning message may be received by the DM in the architecture illustrated in FIG. 2, for example. After the warning message has been received, the DM may process the received information as described for restriction information in FIG. 4 and steps 310-314 in FIG. 3.

The warning message may also involve an action that is performed in response to the reception of the message. Accordingly, the warning message may be an "immediate vacation" message leading to immediate vacation of frequency usage in wider area.

Accordingly, the warning message received form the geo-location database provides generating a site view and triggers creation of the corresponding network plan. Additionally, the plan may be deployed into the network.

Figure 9:
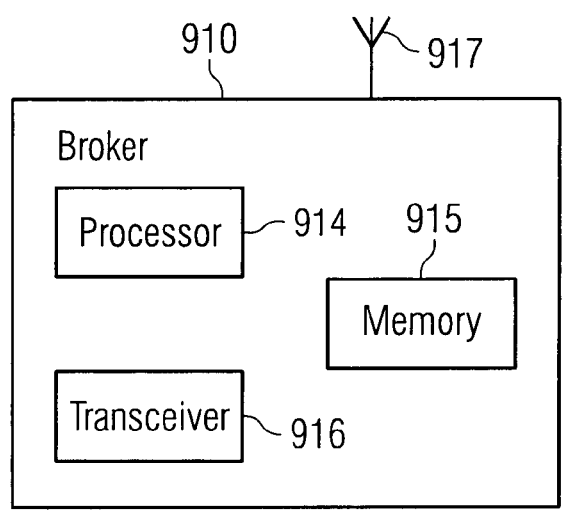
FIG. 9 illustrates an apparatus according to an embodiment.

FIG. 9 illustrates an apparatus 910 according to an embodiment. The apparatus may be a DM or a geo-location database described in the various embodiments herein. It should be understood that each block of the flowcharts of FIGS. 3, 4, 6 and 8 and any combination thereof may be implemented by various means or their combinations, such as hardware, software, firmware, one or more processors and/or circuitry. In one embodiment, a system, e.g. an OAM, may include several devices, such as, for example, a DM and a geo-location database shown in FIG. 2. The system may include more than one DM and geo-location database, although only one of each is shown in FIG. 2 for the purposes of illustration. The DM and geo-location database can be or include a server, a database, a host computer, or any of the network elements discussed herein. Each of these devices may include at least one processor or control unit or module, respectively indicated as 914. At least one memory may be provided in each device, and indicated as 915. The memory may include computer program instructions or computer code contained therein. One or more communications units 916, e.g. a transceiver, may be provided, and each device may also include an antenna, respectively illustrated as 917. Although only one antenna each is shown, many antennas and multiple antenna elements may be provided to each of the devices. Other configurations of these devices may be provided. For example, a DM or geo-location database may be additionally configured for wired communication, in addition to wireless communication, and in such a case the antenna 917 may illustrate any form of communication hardware, without being limited to merely an antenna. Likewise, some DM or geo-location database may be solely configured for wired communication, and such cases the antenna 917 may illustrate any form of wired communication hardware, such as a network interface card.

The transceiver 916 may be a transmitter, a receiver, or both a transmitter and a receiver, or a unit or device that may be configured both for transmission and reception. The transmitter and/or receiver may also be implemented as a remote radio head which is not located in the device itself, but in a mast, for example. It should also be appreciated that according to a liquid or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is configured as software that can run on a server.

The processor 914 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set, for example, procedures, functions, and the like. The memory 915 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity may be internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as a DM or geo-location database, to perform any of the processes described above (see, for example, FIGS. 3, 4, 6 and 8). Therefore, in certain embodiments, a computer-readable medium (for example, a signal or a non-transitory computer-readable medium) may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, or the like, or a low-level programming language, such as a machine language, or assembler. Another option is that the computer program or computer program code is loadable into the device or a memory the device has access to. Alternatively, certain embodiments of the invention may be performed entirely in hardware. Yet another option is that apparatus, such as a network element, is implemented at least partially by undedicated and programmable hardware which uses programmable resources.

It should be appreciated that embodiments may also be carried out at least partially by using cloud services or other software resources which do not necessarily locate in the device itself, but are otherwise available, such as transmittable from a server or host. In certain embodiments, many of the functions may be performed in distributed locations using a virtualization approach to computing.

Furthermore, although FIG. 2 illustrates a system including a DM, embodiments of the invention may be applicable to other configurations, and configurations involving additional elements, as illustrated and discussed herein, for example in FIGS. 3, 4, 6 and 8.

Figure 10A:
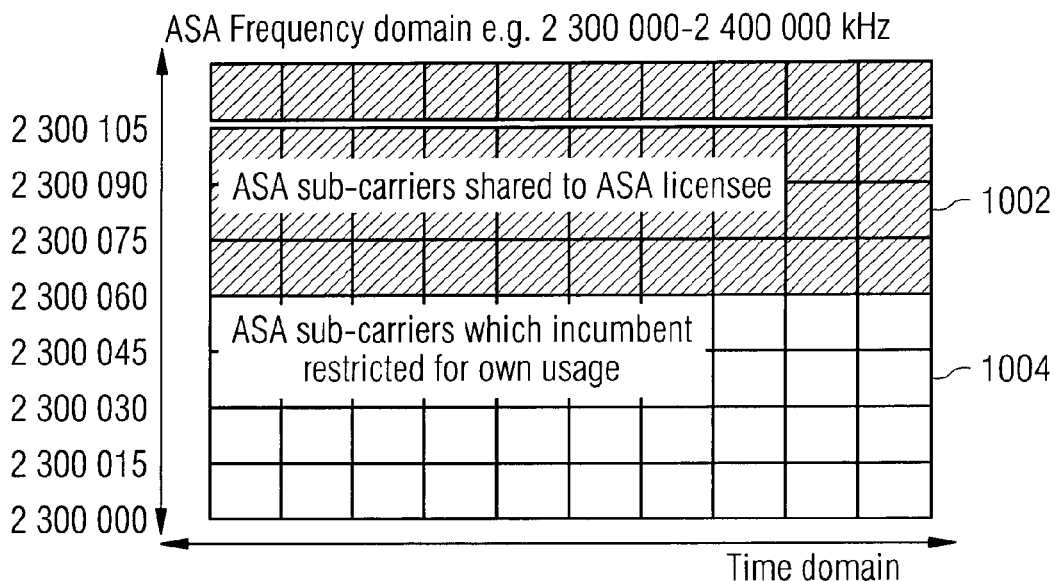
FIGS. 10a and 10b illustrate ASA frequency sharing concept.
Figure 10B:
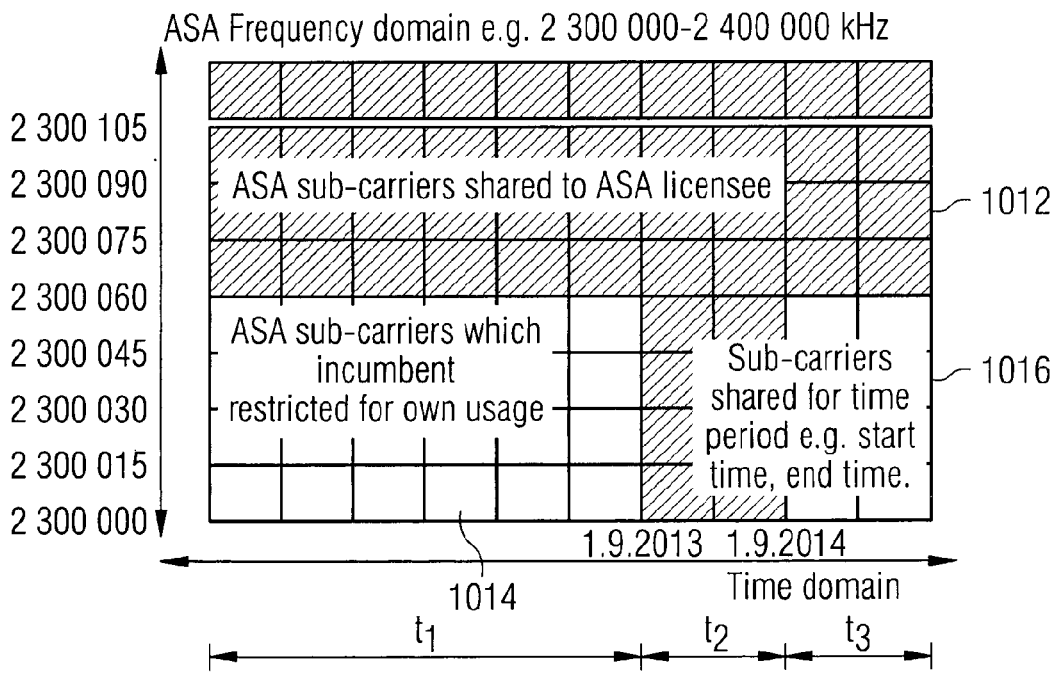

FIGS. 10a and 10b illustrate ASA frequency sharing concept. The ASA frequency sharing concept may be utilized in configuring BTS with operational frequencies from the ASA frequencies, whereby the frequencies are not owned by the operator of the BTSs'. It is also possible to configure a single BTS or a plurality of BTS with both frequencies shared under the ASA concept and with frequencies owned by the operator of the BTSs'. The ASA frequencies include radio frequencies owned by the ASA incumbent. The ownership may be provided by the ASA incumbent holding a license to one of more frequency bands for radio communications. The ASA incumbent may be for example an operator of a mobile communications network. The ASA concept allows ASA licensees to use the ASA incumbent's frequency bands, when the frequency bands are underutilized by the ASA incumbent. The ASA frequency sharing may be provided without compromising confidentiality of the ASA licensee's or the ASA incumbent's network configuration as described by various embodiments above.

In FIGS. 10a and 10b two examples of ASA frequency sharing on a portion of the ASA frequency domain between 2.3 GHz to 2.4 GHz as a function of time is illustrated. It should be appreciated that the ASA frequency domain may include a plurality of ASA incumbents that own frequency bands within the domain. The illustrated portion of the ASA frequency domain includes a 105 kHz portion of the ASA frequency domain. The portion of 105 kHz is owned by the ASA incumbent.

In FIG. 10a, a part 1002 of the 105 kHz, i.e. frequencies 60 kHz to 105 kHz, is shared to the ASA licensee, while the remainder 1004 of the 105 kHz is utilized by the ASA licensee.

In FIG. 10b, the sharing of the 105 kHz frequency domain varies with time. At the beginning, the sharing of the 105 kHz portion of the ASA frequency domain is according to the example of FIG. 10a, whereby the ASA incumbent utilizes the 60 kHz frequency band 1016 starting from 2.3 GHz and the ASA licensee utilizes the higher frequencies 1012. Due to underutilization of the ASA frequencies by the ASA incumbent, the whole 105 kHz frequency band is available for use to the ASA licensees during a time period $t_2$. On the other hand during the time periods $t_1$ and $t_3$, only the higher frequencies are available to be utilized by the ASA licensee. The time periods may be defined by end times and they may be delivered to the ASA licensee according to the schemes illustrated in FIGS. 4 and 6, when the DM is operated by the ASA licensee.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method configured for communicating with
   a geo-location database maintaining geographical information on availability of licensed frequency spectrum for shared use, and
   a database storing a site map of a mobile communications network, said map including locations of sites, where wireless access to the mobile communications network is provided, the method comprising:
   obtaining geographical information on the availability of the licensed frequency spectrum for the shared use;
   obtaining the site map of the mobile communications network, said map including the locations of the sites, wherein the wireless access to the mobile communications network is provided;
   determining a configuration of frequencies for the sites on the basis of the available licensed frequencies for the shared use at each location of the sites;
   determining coverage areas of one or more of the sites of the mobile communications network; and
   generating a request including the determined coverage areas to the database including the information on the availability of the licensed frequency spectrum for the shared use,
   wherein the coverage areas are distorted by applying a mask pattern to the coverage areas, and
   wherein the method further comprises sending the distorted coverage areas to the database holding the site map of the coverage areas.

2. The method according to claim 1, comprising:
   communicating the determined configuration to an Operations Administration and Maintenance (OAM) system of the mobile communications network for commissioning the determined configuration.

3. The method according to claim 1, wherein the geographical information is obtained in response to a request including information indicating a targeted or current coverage area of the mobile communications network.

4. The method according to claim 1, wherein the geographical information is obtained in response to a request including information indicating a targeted or current coverage area of the mobile communications network and the obtained geographical information defines geographical areas corresponding to the coverage areas indicated in the request.

5. The method according to claim 1, wherein the obtained geographical information indicates geographical areas and associated restrictions for the shared use of the licensed frequencies.

6. The method according to claim 5, wherein the associated restrictions, comprising a received power level of substantially 0 dBm, deny utilization of the licensed frequencies for shared use.

7. The method according to claim 1, wherein the site map comprises geographical locations and profiles of the sites, and the method further comprises:
   determining the sites that include one or more cells that overlap with the obtained geographical information; and
   adjusting the profiles of the determined sites on the basis of restrictions.

8. The method according to claim 1, wherein the geographical information on the availability of the licensed frequency spectrum for the shared use comprises information of one or more geographical areas associated with a limit for received power, a permitted licensed frequency for the shared use, a validity period of the information or a combination thereof.

9. The method according to claim 1, wherein a frequency configuration of a plurality of sites of the one or more of the site of the coverage areas is determined, wherein each site of the plurality of sites includes one or more cells, and a first part of the cells of the sites are configured with a licensed frequency underutilized by a licensor and a second part of the cells is configured with the licensed frequency owned by an operator of the mobile communications network.

10. The method according to claim 1, wherein the geographical information is received in response to a request including an area of interest, the area of interest comprising a target coverage area of the mobile communications network, at a database including information on the availability of the licensed frequency spectrum for the shared use.

11. A method by a geo-location database connected to a node managing a frequency configuration of a mobile communications network, the method comprising:
    maintaining information on a licensor and shared use of licensed frequencies;
    determining, on a basis of the maintained information, availability of the licensed frequencies of the licensor for the shared use;
    communicating by the licensor the availability of the licensed frequencies for the shared use to the node managing the frequency configuration of the mobile communications network, when the availability of the licensed frequencies changes or a request is obtained from the node for the availability of the licensed frequencies for the shared use; and
    receiving the request including current or targeted coverage areas of the mobile communications network,
    wherein the current or targeted coverage areas are distorted by applying a mask pattern to the current or targeted coverage areas, and
    wherein the distorted coverage areas are received at the geo-location database holding a site map of the coverage areas.

12. The method according to claim 11, wherein the maintained information comprises geographical areas associated with information of utilization of the licensed frequencies by the licensor on a geographical area of the associated geographical areas, the method comprising:
    determining an overlap between the received coverage areas and the geographical areas of the maintained information; and
    communicating the overlap to the node managing the frequency configuration of the mobile communications network.

13. The method according to claim 11, comprising:
    determining an increased utilization of the licensed frequencies by the licensor; and
    notifying the node managing the frequency configuration of the mobile communications network utilizing the shared licensed frequencies.

14. The method according to claim 11, wherein the communicated availability includes: information of one or more geographical areas overlapping between the maintained information and coverage areas of the mobile communications network associated with a limit for received power, a permitted licensed frequency for the shared use, a validity period of the information or a combination thereof.

15. An apparatus comprising:
a communications unit for communicating with a first node maintaining geographical information on availability of licensed frequency spectrum for shared use, and for communicating with a second node storing a site map of a mobile communications network, said map including locations of sites, where wireless access to the mobile communications network is provided; and
a controller in communication with the communications unit to:
obtain geographical information maintained by the first node;
obtain the site map from the second node;
determine a configuration of frequencies for the sites on the basis of available licensed frequencies for the shared use at each location of the sites;
determine coverage areas of one or more of the sites of the mobile communications network; and
generate a request including the determined coverage areas to the database including information on the availability of the licensed frequency spectrum for the shared use,
wherein the coverage areas are distorted by applying a mask pattern to the coverage areas, and
wherein the controller further sends the distorted coverage areas to a database holding the site map of the coverage areas.

16. A geo-location database comprising:
a memory for maintaining information on a licensor and shared use of licensed frequencies;
a communications unit for communicating with a node managing a frequency configuration of a mobile communications network; and
a controller in communication with the communications unit and the memory to:
determine, on a basis of the maintained information, availability of the licensed frequencies of the licensor for the shared use;
communicate the availability to the node managing the frequency configuration of the mobile communications network, when the availability of the licensed frequencies changes or a request is received from the node for the availability of the licensed frequencies for the shared use; and
receive the request including current or targeted coverage areas of the mobile communications network,
wherein the current or targeted coverage areas are distorted by applying a mask pattern to the current or targeted coverage areas, and
wherein the distorted coverage areas are received at the geo-location database holding a site map of the coverage areas.

17. A computer program embodied on a non-transitory computer readable storage medium, the computer program being configured to control a processor to perform a method comprising:
obtaining geographical information on availability of licensed frequency spectrum for shared use;
obtaining a site map of a mobile communications network from a database, said map including locations of sites, where wireless access to the mobile communications network is provided;
determining a configuration of frequencies for the sites on the basis of the available licensed frequency for the shared use at each location of the sites;
determining coverage areas of one or more of the sites of the mobile communications network; and
generating a request including the determined coverage areas to the database including the information on the availability of the licensed frequency spectrum for the shared use,
wherein the coverage areas are distorted by applying a mask pattern to the coverage areas, and
wherein the computer program is further configured to control the processor to send the distorted coverage areas to the database holding the site map of the coverage areas.

18. A computer program embodied on a non-transitory computer readable storage medium, the computer program being configured to control a processor to perform a method comprising:
maintaining information on a licensor and shared use of licensed frequencies;
determining, on a basis of the maintained information, availability of the licensed frequencies of the licensor of the shared use; and
communicating the availability of the licensed frequencies for the shared use to a node managing a frequency configuration of a mobile communications network, when the availability of the licensed frequencies changes or a request is obtained from the node for the availability of the licensed frequencies for the shared use; and
receiving the request including current or targeted coverage areas of the mobile communications network,
wherein the current or targeted coverage areas are distorted by applying a mask pattern to the current or targeted coverage areas, and
wherein the method further comprises receiving the distorted coverage areas at a geo-location database holding a site map of the coverage areas.

19. A system comprising
a first apparatus comprising:
a communications unit for communicating with a first node maintaining geographical information on availability of licensed frequency spectrum for shared use, and for communicating with a second node storing a site map of a mobile communications network, said map including locations of sites, where wireless access to the mobile communications network is provided; and
a first controller in communication with the communications unit to:
obtain the geographical information maintained by the first node; and
obtain the site map from the second node; and
said system comprising a second apparatus comprising:
a memory for maintaining information on a licensor and shared use of licensed frequencies of the shared use spectrum;
a communications unit for communicating with a node managing a frequency configuration of the mobile communications network; and
a second controller in communication with the communications unit and the memory to:
determine, on a basis of the maintained information, availability of the licensed frequencies for the shared use;

communicate the availability to the node managing the frequency configuration of the mobile communications network, when the availability of the licensed frequencies changes or a request is received from the node for the availability of the licensed frequencies for the shared use; and receive the request including current or targeted coverage areas of the mobile communications network, wherein the current or targeted coverage areas are distorted by applying a mask pattern to the current or targeted coverage areas, and wherein the first controller further sends the distorted coverage areas to the database holding the site map of the coverage areas.

* * * * *